United States Patent
Yang et al.

(10) Patent No.: US 8,164,846 B1
(45) Date of Patent: Apr. 24, 2012

(54) HYBRID DEFECT DETECTION FOR RECORDING CHANNELS

(75) Inventors: Xueshi Yang, Cupertino, CA (US); Yu-Yao Chang, Sunnyvale, CA (US); Michael Madden, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 198 days.

(21) Appl. No.: 12/336,308

(22) Filed: Dec. 16, 2008

Related U.S. Application Data

(60) Provisional application No. 61/015,444, filed on Dec. 20, 2007.

(51) Int. Cl.
*G11B 5/02* (2006.01)
*G11B 27/36* (2006.01)

(52) U.S. Cl. .......................................... 360/25; 360/31
(58) Field of Classification Search .................. None
See application file for complete search history.

(56) References Cited

U.S. PATENT DOCUMENTS

| | | | |
|---|---|---|---|
| 6,014,277 A * | 1/2000 | Christensen et al. | 360/53 |
| 6,172,953 B1 * | 1/2001 | Kamiyama | 369/53.15 |
| 6,175,459 B1 * | 1/2001 | Tomita | 360/53 |
| 6,307,822 B1 | 10/2001 | Shim et al. | |
| 7,187,638 B2 | 3/2007 | Tsai et al. | |
| 2005/0078580 A1 | 4/2005 | Kochale et al. | |
| 2007/0104061 A1 * | 5/2007 | Aufderheide et al. | 369/53.2 |
| 2008/0262643 A1 * | 10/2008 | Creigh et al. | 700/110 |

OTHER PUBLICATIONS

Yang et al., "Defect Detection Design," U.S. Appl. No. 11/907,676, filed Oct. 16, 2007, to be published by the USPTO, 38 pages.

* cited by examiner

*Primary Examiner* — Daniell L Negron
*Assistant Examiner* — Regina N Holder

(57) ABSTRACT

Methods, systems and computer program products for performing hybrid defect detection are disclosed. A hybrid defect detection mechanism may be used to detect various classes of defects (e.g., long and shallow defects, and short and deep defects) while reducing the probability of a miss or false alarm. In some implementations, the hybrid defect detection mechanism may utilize a defect detector that includes one or more defect sub-detectors. Each defect sub-detector may be associated with an individual threshold and sliding window length to enhance the hybrid defect detection process that maximizes the detection of a specific type or class of defects.

21 Claims, 7 Drawing Sheets

```
                          500

┌─────────────────────────────────────────┐
    │ Sample a data signal associated with a  │
    │ storage medium to generate signal       │
    │ samples                                 │
    │                  502                    │
    └─────────────────────┬───────────────────┘
                          ▼
    ┌─────────────────────────────────────────┐
    │ Apply a first set of parameters and a   │
    │ second set of parameters to the signal  │
    │ samples to generate a first output and  │
    │ a second output                         │
    │                  504                    │
    └─────────────────────┬───────────────────┘
                          ▼
    ┌─────────────────────────────────────────┐
    │ Identify media defects based on the     │
    │ first output and the second output      │
    │                  506                    │
    └─────────────────────────────────────────┘
```

500

Sample a data signal associated with a storage medium to generate signal samples
502

Apply a first set of parameters and a second set of parameters to the signal samples to generate a first output and a second output
504

Identify media defects based on the first output and the second output
506

FIG. 5

HYBRID DEFECT DETECTION FOR RECORDING CHANNELS

CROSS-REFERENCE TO RELATED APPLICATIONS

This application claims priority to U.S. Provisional Application Ser. No. 61/015,444 titled "HYBRID DEFECT DETECTION FOR RECORDING CHANNELS," filed on Dec. 20, 2007, the disclosure of which is incorporated herein by reference in its entirety.

TECHNICAL FIELD

The subject matter of this application is generally related to data storage systems, such as magnetic disk drives.

BACKGROUND

Various types of disk drives, such as magnetic disk drives, are used to provide data storage for a host device through a bus or network. Typical host devices include stand alone computer systems such as a desktop or laptop computer, enterprise storage devices such as servers, storage arrays such as a redundant array of independent disks arrays, storage routers, storage switches and storage directors, and other consumer devices such as video game systems and digital video recorders. These devices provide high storage capacity in a cost effective manner.

During the manufacturing process of a media, defects can damage a sector of the media and prevent data from being reliably stored in or retrieved from that sector. Defects are flaws within the media, which may result from the presence of dust particles. In other instances, defects may result from aberrations during the manufacturing process. For example, defects may be minute pinholes or asperities caused by the failure of the coating, plating or sputtering processes used to manufacture the media. These defects, if not accurately identified and corrected, can make a portion of the media unsuitable for the storage of information.

SUMMARY

Methods, systems and computer program products for performing hybrid defect detection are disclosed. A hybrid defect detection mechanism may be used to detect various classes of defects (e.g., long and shallow defects, and short and deep defects) while reducing the probability of a miss or false alarm. In some implementations, the hybrid defect detection mechanism may utilize a defect detector that includes one or more defect sub-detectors. Each defect sub-detector may be associated with an individual threshold and sliding window length to enhance the hybrid defect detection process that maximizes the detection of a specific type or class of defects.

In some implementations, a method may be implemented that includes sampling a data signal associated with a storage medium to generate signal samples, applying a first set of parameters to the signal samples to generate a first output and a second set of parameters to the signal samples to generate a second output, and identifying media defects based on the first output and the second output.

In some implementations, an apparatus may be used that includes a sample module to sample data signals corresponding to data on a storage medium to generate one or more groups of signal samples, a plurality of defect detectors each receiving a corresponding group of signal samples and applying a different set of parameters to the corresponding group of signal samples, and logic to receive corresponding outputs from the plurality of defect detectors and identify one or more media defects based on the outputs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a flow chart showing an example process for detecting various classes of defect.

Like reference symbols in the various drawings indicate like elements.

DETAILED DESCRIPTION

Hard Disk Drive System Overview

Figure 1A:
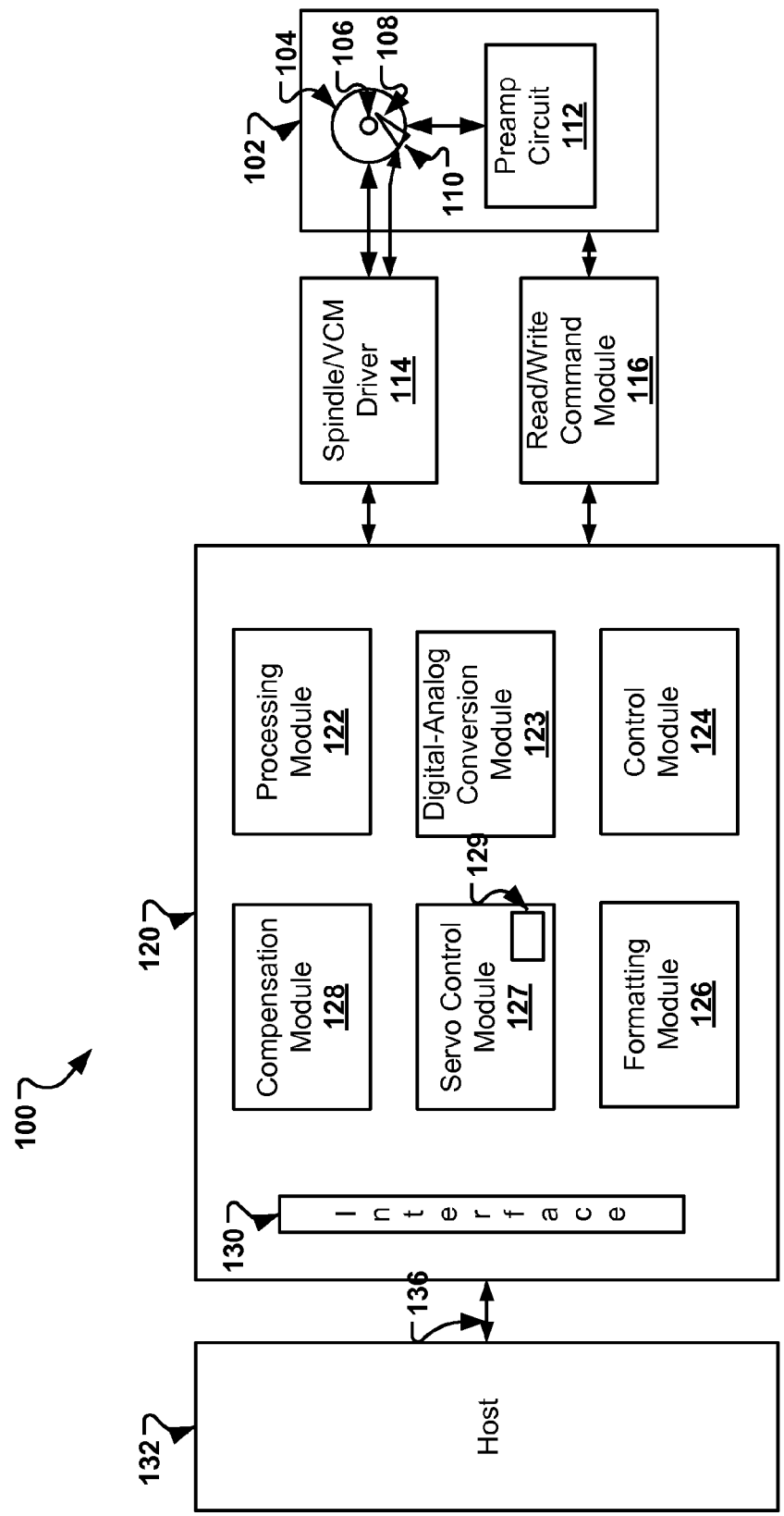
FIG. 1A shows an example hard disk drive system.
Figure 1B:
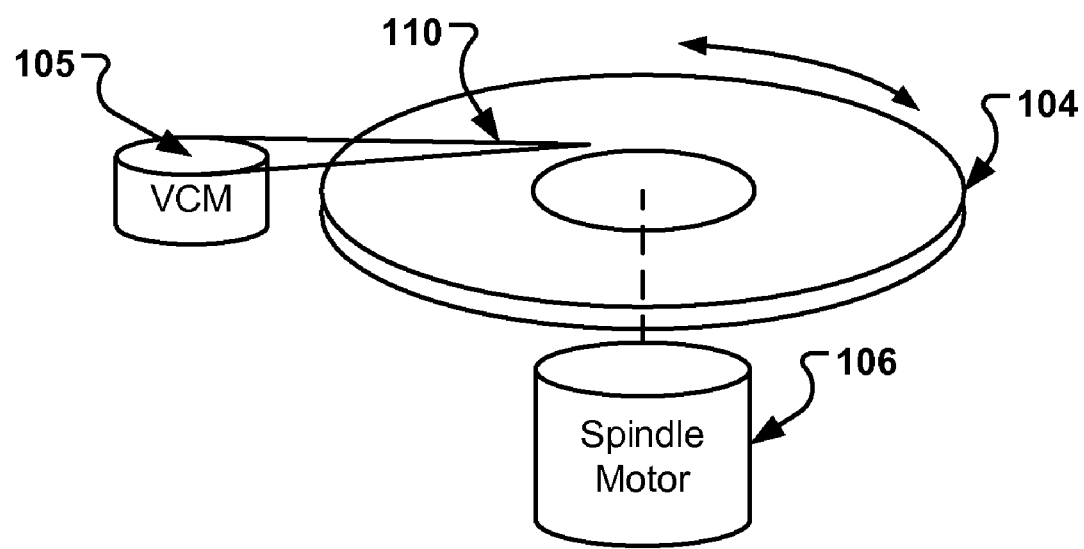
FIG. 1B shows a disk controlled by a spindle motor.

FIG. 1A shows an example hard disk drive (HDD) system 100 and FIG. 1B shows a disk 104 controlled by a spindle motor 106. As shown in FIGS. 1A and 1B, the HDD system 100 includes a printed circuit board (PCB) 120. The PCB 120 includes a processing module 122, a digital-analog conversion module 123, a control module 124, a formatting module 126, a servo control module 127, a compensation module 128 and a communications interface 130, each of which is connected through one or more internal buses (not shown).

The processing module 122 can perform data and/or control processing related to the general operation of the HDD system 100. For example, the processing module 122 can execute instructions received from the control module 124 to control disk drive functions. These functions may include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementations, the processing module 122 also can store various firmware routines for controlling the operation of the spindle motor 106 such as, without limitation, startup routines, speed control routines, spin down routines and parking routines.

The processing module 122 can include registers and buffers for storing, for example, flags indicating whether a spin-up operation has been successfully completed. Alternatively, the flags can be stored in a register defined by a memory location in a memory unit separate from the processing module 122.

In some implementations, the processing module 122 can include a pulse width modulation (PWM) controller (not shown) for generating control signals so as to control the spindle/VCM driver 114 to drive the spindle motor 106 at a substantially constant speed while the disk drive is in use. The spindle/VCM driver 114 can receive VCM control signals from the PWM controller and generate a corresponding command signal to command the VCM 105 for positioning the actuator arm 110 and the read/write head 108, for example, as part of a parking operation. The VCM 105 can be controlled by the servo control module 127, and can be configured to apply torque to the read/write head 108 to swing the read/write head 108 during, for example, a track-seeking operation and to maintain the head 108 at a desired angular position during a track-following operation.

The spindle/VCM driver 114 can, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide information associated with the zero crossing signal to the processing module 122, for example, to compute the velocity of the spindle motor 106.

The control module 124 may function to manage and handle data transfer between the PCB 120 and the host 132 during read and write operations through the host interface 130. The host interface 130, in some implementations, may include a Serial Advanced Technology Attachment (SATA) interface or a Parallel Advanced Technology Attachment (PATA) interface. A SATA interface or PATA interface may be used to convert serial or parallel data into parallel or serial data, respectively. For example, if the host interface 130 includes a SATA interface, then the SATA interface may receive serial data transferred from the host 132 through a bus 136 (e.g., a SATA bus), and convert the received serial data into parallel data. In other implementations, the host interface 130 may include a hybrid interface. In these implementations, the hybrid interface may be used in conjunction with, for example, a serial interface.

The control module 124 also may include servo logic for managing the positioning of the read/write head 108 when seeking (e.g., moving from one track to a non-adjacent track) and during tracking (e.g., staying on a single track).

The control module 124 may communicate with the host interface (e.g., an input/output interface) 130 and with the spindle/VCM driver 114 or the read/write command module 116. The control module 124 may coordinate control of the spindle/VCM driver 114, the read/write command module 116, the processing module 122, the compensation module 128 and the formatting module 126.

The control module 124 may receive a command from the host 132 to generate a spin-up command while the spindle motor 106 is at rest to begin the spin-up mode of operation. The processing module 122 may receive the spin-up command from the control module 124 and retrieve an associated control routine for the spin-up mode of operation from a memory unit.

The formatting module 126, in some implementations, may include a servo formatter and a disk formatter. The disk formatter may be used to control the formatting of data and provide clock signals and other timing signals that control the flow of the data written to, and data read from one or more magnetic disks or platters 104. Similarly, the servo formatter may provide clock signals and other timing signals based on servo control data read from the disk 104.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and similar algorithms to allow for the verification of the integrity of the data that is written. During read operations, the read/write head 108 may generate read signals (e.g., analog signals), and the read/write command module 116 may convert the analog read signals into digital read signals. The converted signals may be detected and decoded by conventional techniques to recover data written by the read/write head 108.

Head Assembly

Signals between the HDD head assembly 102 and the PCB 120 can be carried, for example, through the bus 136 or a flexible printed cable. The HDD head assembly 102 may include one or more magnetic disks or platters 104 for storing magnetic data. The platters 104 may be rotated by the spindle motor 106. The spindle motor 106 may rotate the magnetic platters 104 at a controlled speed during the read/write operations. The read/write actuator arm 110 may move relative to the magnetic platters 104 in order to read and/or write data to/from the magnetic platters 104. The spindle/VCM driver 114 may be configured to control the spindle motor 106, which rotates the magnetic platters 104. If desired, the spindle/VCM driver 114 also may generate control signals for positioning the read/write actuator arm 110 using the voice coil actuator 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the magnetic platters 104.

The HDD head assembly 102 also may include a predmp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the magnetic platters 104. The write current changes polarity upon each change in the binary value of the write data signal.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the compensation module 128, the processing module 122, the servo control module 127, the detection module 126, the digital-analog conversion module 123 and the control module 124 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

Information may be stored on each platter 104 in concentric tracks. Data tracks may be divided into sectors. Information may be written to and/or read from a storage surface(s) of a disk by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed. The read/write head 108 may access different sectors within each track on the platter 104.

Operation of the actuator arm 110 may be controlled by the servo control module 127. The servo control module 127 may move the read/write head 108 according to two primary operations: seek control operation and track following operation.

In a seek control operation, the servo control module 127 controls the actuator arm 110 such that the read/write head 108 may be transitioned from an initial position to a target track position for which the host 132 has requested. A seek control operation generally includes accelerating, decelerating and settling the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the head 108 to rest over a target track within a selected settle threshold or window, which may be based on a percentage of the track width from the center of the track. The servo control module 127 may employ, for example, a pre-loaded algorithm, to ensure that the head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the head 108 is settled over a desired track, the servo control module 127 may initiate a track following mode. In the track following mode, the head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which may include a digital-analog converter, can operate to convert data between the digital form used by the PCB 120 and the analog form conducted through the head 108 in the HDD head assembly 102. The HDD head assembly 102 can provide servo position information read by the head 108 to the servo control module 127. Servo sectors on each of the platters 104 can include head location information, such as a track identification field and data block address, for identifying a target track and data block, and burst fields to provide servo fine location information. The head location information read by the head 108 may be converted from analog signals to digital data by the digital-analog converter, and fed to the servo control module 127. The servo positional information can be used to detect the location of the head 108 in relation to a target track or target data sectors on the platters 104. The servo control module 127 may utilize, for example, target data sectors and servo position information to precisely place the head 108 over the target track and data sector on the platters 104, and to continuously maintain the head 108 aligned with the target track while data is written/read to/from one or more identified data sectors.

The digital-analog conversion module 123 may be used for converting control signals (e.g., for controlling the position of the head 108) generated by the control module 124 into analog signals (and from analog signals into digital data). For example, a head position signal may be generated by the control module 124 and provided to the digital-analog conversion module 123. The digital-analog conversion module 123 then may convert the head position signal into an analog signal (e.g., a voltage signal) for driving the VCM 105 coupled to the actuator arm 110. The actuator arm 110 may subsequently move the head 108 along the surface of the platters 104 based on the analog signal provided by the digital-analog conversion module 123.

In some implementations, the digital-analog conversion module 123 may be configured to output, for example, different analog voltage ranges to account for resolution needs at different operating conditions. In these implementations, the digital-analog conversion module 123 may have one or more selectable modes. For example, the digital-analog conversion module 123 may utilize certain modes (i.e., referred to here as "higher modes") to provide a larger voltage range and bigger current scale but at a lower resolution (volts/digital count). In these implementations, higher modes may be used, for example, during seeking control operations where a large voltage range is generally desirable. Conversely, the digital-analog conversion module 123 may employ other modes (i.e., referred to here as "lower modes") to provide a higher resolution (e.g., smaller voltage steps per digital count). Lower modes may be used, for example, for tracking following operations where high resolution is critical to servo tracking performance.

In some implementations, the servo control module 127 may include a servo controller 129 to control mechanical operations related to servo processing, such as, but not limited to, head positioning (e.g., through the HDD head assembly 102) and rotational speed control (e.g., through the VCM 105). The servo controller 129 may include one or more IC chips (e.g., a combo chip), which can include read/write channel signal processing circuitry The servo controller 129 also may include a microprocessor and a hard disk controller. The drive electronics hosting the controller 129 also may include various interfaces, such as a host-bus interface, and memory devices, such as a read only memory (ROM) for use by a microprocessor, and a random access memory (RAM) for use by the controller 129.

In some implementations, the servo controller 129 may be a self-servo-write controller that manages servo information and how these servo information are to be written on a machine-readable medium. The servo controller 129, in these implementations, may be integrated into the head assembly 102. In other implementations, the self-servo controller 129 may be integrated into the processing module 122, the control module 124, the preamp circuit 112, or combinations thereof (e.g., in implementations where the processing and control modules 122 and 124 and the preamp circuit 112 may be combined into a single integrated circuit).

Defect Detection

Media defects in magnetic recording (e.g., surface defects on disk 104) can manifest themselves via abnormal readback signal amplitude through multiple number of data bits. Defects in magnetic media can cause data loss or drive damage. A defect may include a reduction in the magnetic material at a certain region on the surface of the medium, and the reduction of the magnetic material below a standard level may result in a reduction of the signal amplitude as detected from the medium. The defect also may include an increase in the magnetic material at a certain region on the surface of a magnetic medium as a raised feature. The increase in the magnetic material above a standard level may result in an increase of the signal amplitude.

A "miss" defect occurs where an existing defect is not identified accurately by the HDD system 100. Similarly, a false alarm occurs where a defect is falsely identified by the HDD system 100. If sectors containing defects are not mapped out correctly (e.g., where there are many missed defects), attempts to read data from such sectors may generate a multitude of errors which even robust error correction coding may not be able to correct. On the other hand, if too many falsely-identified sectors that do not contain defects are mapped out, the capacity of the disk drive may be needlessly reduced.

Generally, media defects may be characterized by two parameters: defect length (e.g., how many data bits are affected) and defect depth or amplitude (e.g., through signal amplitude attenuation or amplification). Defects generally include two classes: a relatively long defect and a relatively short defect.

Long defect is typically associated with a detection signal level lower than a threshold level and may last a relatively long period. Short defect, which may result from mechanical imperfections or human errors (e.g., stains, fingerprints and the like), may last a relatively short period of time. Long deep defects are relatively easy to detect and short shallow defects are relatively minor to effectuate any difference in signal amplitude.

On the other hand, long shallow defects or short deep defects are harder to detect (e.g., due to the shallow nature or short duration of the defects). Long shallow defects and short deep defects, when undetected, can have detrimental effects in channel performance, and particularly in iterative code applications.

Conventional systems provide defect detection mechanisms that attempt to detect both the long shallow defects and short deep defects. For example, to detect a media defect during a read back operation, conventional solutions may utilize different types of data patterns to provide different sensitivity to different types of media defect size. The data patterns may be written onto the media and read back periodically. Because the data patterns are periodic and fixed, the amplitude of the readback signal may provide an indication as to whether a defect exists (e.g., a defect does not exist where the amplitude is constant, and a defect exists where the amplitude fluctuates significantly).

However, these detection mechanisms typically achieve such detection based on a trade-off between the probability of a miss and the probability of a false alarm. This in turn may reduce both the drive yield and the drive capacity. In addition, defects arise during usage of the drive, which in turn requires dynamic defect detection. Conventional techniques that utilize specific known data pattern are therefore ineffective for dynamic defect detection.

In part to address these issues, in some implementations according to the present invention, a hybrid detection mechanism may be provided that detects various classes of defects such as, without limitation, long and shallow defects, and short and deep defects while reducing the probability of a miss or false alarm.

In some implementations, the defect detector may use a threshold or a set of thresholds to generate nonzero digital (or analog) defect metrics when the signals sampled at the input exceed the threshold or the set of thresholds. The threshold or the set of thresholds may include parameters of a discrimination function that classifies the signal samples as, for example, normal, impaired or defective.

In these implementations, the hybrid detection may utilize a defect detector that includes one or more defect sub-detectors. In some implementations, each defect sub-detector may be configured with a same or different sliding window length "W" and a threshold level "T". As an example, one sub-detector may have a sliding window length W1 and a threshold T1, and another sub-detector may have a sliding window length W2 and a threshold T2. As yet another example, one sub-detector may have a sliding window length W1 and a threshold T1, and another sub-detector may have a sliding window length W1 and a threshold T2. As yet another example, one sub-detector may have a sliding window length W1 and a threshold T1, and another sub-detector may have a sliding window length W2 and a threshold T1.

In some implementations, an indicator value may be determined from the signal samples spanned by a particular sliding window length. A sub-detector may then compare the indicator value with an associated threshold to generate an output indicative of a specific type of defect at a location (or sector) corresponding to the location from which the readback signal (e.g., readback signal 202) is generated.

As an example, a sub-detector may be associated with a sliding window length W1 and a threshold T1. In this example, the sub-detector may determine an indicator value from signal samples that fall within the sliding window W1, and compare the indicator value against the threshold T1 to generate an output indicative of a specific type of defect at the location from which the sampled signals are read.

In some implementations, a second sub-detector also may be used in conjunction with the sub-detector discussed above. In these implementations, the second sub-detector may be associated with a sliding window length W2 and a threshold T2. The sliding window length W2 and a threshold T2 may be different from the sliding window length W1 and a threshold T1 of the sub-detector discussed above. The second sub-detector may determine an indicator value from signal samples that fall within the sliding window W2, and compare the indicator value against the threshold T2 to generate an output indicative of a specific type of defect at the location from which the sampled signals are read.

The outputs from both sub-detectors may be prioritized or given a specific weight in determining a final detector output that provides an accurate estimation of the type of defect present to the location or sector of interest, as will be discussed in greater detail below. In general, both the sliding window length and the threshold level may be used to effectuate an accurate defect detection process that may be based upon, for example, the threshold crossing of an indicator value deduced from signal samples spanned by a particular sliding window length.

In some implementation, the indicator value may pertain to a correlation between the detected data bits and the readback signal normalized by the corresponding signal amplitude. The correlations may be calculated based on the samples falling into a sliding window. For example, for a sliding window length of W1, W1 samples may be used to calculate the normalized correlation value. In this example, a large normalized correlation value may indicate a strong correlation between the detected data bits and the readback signal (e.g., which may imply a good signal quality). Conversely, a small normalized correlation value may indicate a weak correlation between the detected data bits and the readback signal (e.g., which may imply a low signal quality that can be translated into defects in the media). Where a weak correlation is identified, a predetermined threshold may be used for comparison in determining the presence/absence of a media defect.

The indicator value also may pertain to a number of samples associated with poor or low signal quality, where the signal quality may be evaluated based on its amplitude or the correlation between the detected data bits and the readback signals. As will be readily appreciated, other indicator values also may be used, and are not limited to those discussed above.

During operation, a data pattern may be generated and written to at least a portion of the disk 104. Then, the written data may be read back by the read/write head 108, and the readback signals may be sampled to generate one or more discrete samples. The discrete samples may then be fed, in parallel or in series, to each individual defect sub-detector to detect deviation of the readback signal using a corresponding window and threshold so as to classify a specific type of media defect (e.g., a long deep defect or a short shallow defect). Because each defect sub-detector may be configured with a same or different window length and threshold, defects with different characteristics may be targeted and detected. The output of each sub-detector may subsequently be processed by a combination logic that may output a defect flag to determine a specific defect associated with the readback signal.

Figure 2:
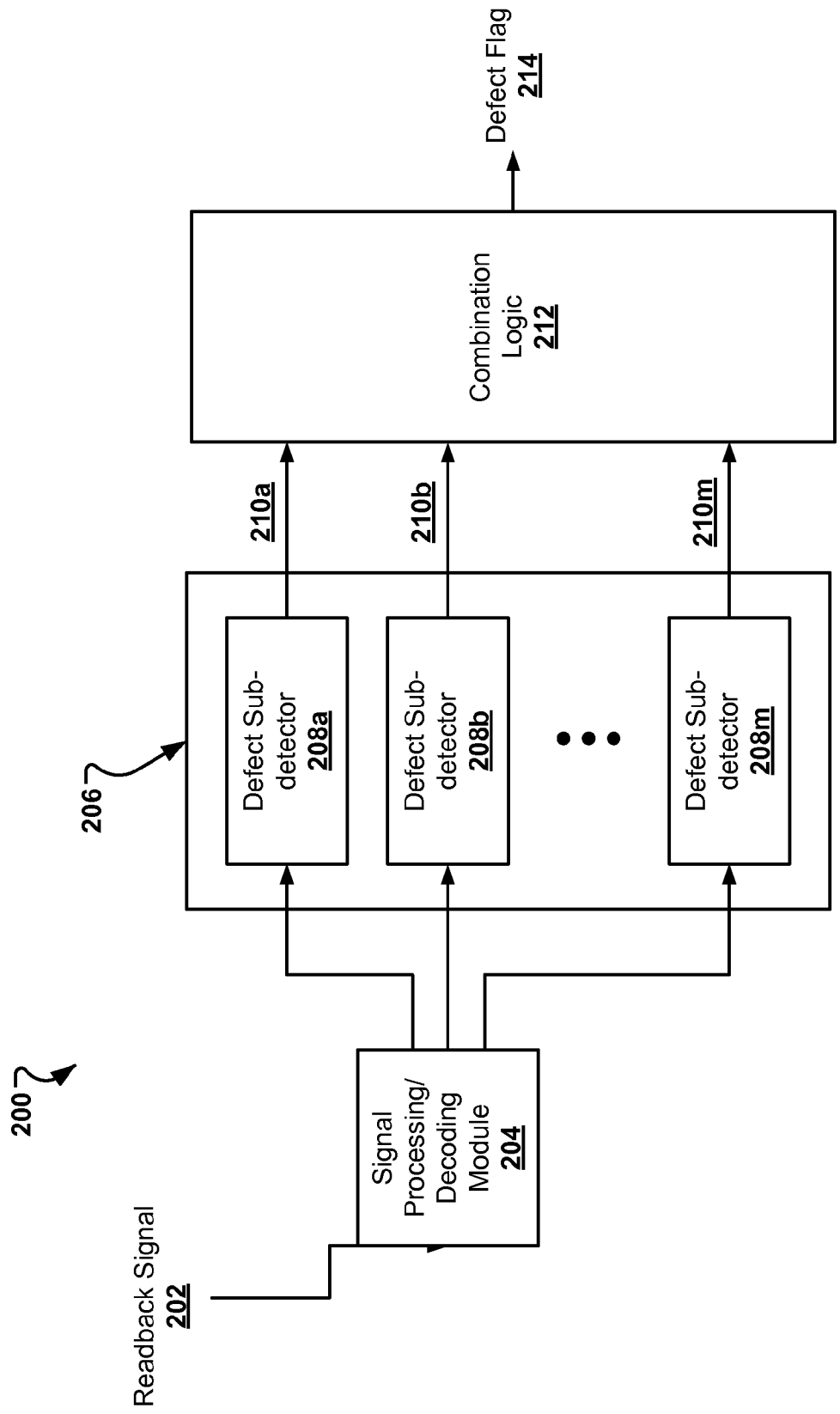
FIG. 2 shows an example defect detection system that employs one or more sub-detectors to detect the presence of a defect.

Referring to FIG. 2, the signal samples of a sample readback signal may be input to each defect sub-detector 208. In some implementations, the signal samples may be partitioned into one or more segments each corresponding to a sector or portion of a sector. In some implementations, one or more sub-detectors 208 may receive the same segment of the signal samples while the remaining sub-detectors 208 may receive a different segment of the signal samples. In other implementations, all of the sub-detectors 208 may receive the same segment of the signal samples. In yet other implementations, all of the sub-detectors 208 may receive a different segment of the signal samples.

The defect sub-detector 208 may apply a specific sliding window having a predetermined length to each segment of the signal samples. In some implementations, the sliding window of each defect sub-detector 208 may cover a specific segment (or segments) of the signal samples of the sampled readback signal. For example, the signal samples may be segmented into one or more signal sample groups separated by a predetermined number of signal samples. The sliding window may then be applied to mask a specific signal sample group so as to progressively slide the window by the predetermined number of signal samples (e.g., a sliding window of a first defect sub-detector may be defined to evaluate the first one hundred samples of the signal samples, and a sliding window of a second defect sub-detector may be defined to evaluate the first fifty samples of the signal samples).

In some implementations, the size of the sliding window may be selected to include any number or segment of the signal samples of the readback signal. In one embodiment, the sliding window may include signal samples corresponding to different regions of the disk 104, and the sliding window may be moved continuously over the entire surface of the disk 104 so that the extent of the defect, when detected, also may be identified.

FIG. 2 shows an example defect detection system 200 that uses one or more sub-detectors to detect the presence of a defect. Referring to FIG. 2, the readback signal 202 may be generated by the read/write head 108. For example, during read operations, analog data signals may be received from the read/write head 108 through preamp circuit 112. The analog data signals may be processed by a pre-processing stage including a conditioning stage (e.g., through an amplification or filtering process to remove random noise or harmonic frequencies and to enhance the quality of the readback signal 202), a decoding stage (e.g., to extract data from the readback signal 202) and a formatting stage (e.g., to provide a readable format suited for signal processing and sampling) to provide digital data signals to control module 124. In some implementations, the control module 124 may include one or more internal circuits to execute the pre-processing stage including, without limitation, an automatic gain control circuit, a low pass or high pass filter, a variable frequency oscillator, a sampler, an equalizer such as a finite impulse response filter, a maximum likelihood, partial response detector, a deserializer and the like.

In some implementations, the control module 124 also may include a defect detection system 200. In some implementations, the defect detection system 200 may interact with other signal processing and decoding blocks. For example, once media defects have been identified by the defect detection system 200, an automatic gain control loop may be terminated to avoid the HDD system 100 from adapting to abnormal signals derived from such media defects. In some implementations, the defect detection system 200 may include a signal process/decoding module 204, a defect detector 206 (including one or more sub-detectors 208), and combination logic 212, as will be discussed in greater detail below.

In some implementations, after a pre-processing stage, the readback signal 202 may be sampled by the signal process/decoding module 204 (e.g., by providing a clock signal and applying the clock signal indicating when the signal process/decoding module 204 may sample and hold the readback signal) to generate one or more signal samples and the corresponding recovered bits. The signal samples and the recovered bits may then be subsequently fed as inputs to the defect detector 206.

In some implementations, the signal process/decoding module 204 may include an A/D converter and an equalizer. The A/D converter may be used to receive the readback signal 202 and convert the readback signal 202 into digitized samples. In some implementations, a clock signal may be provided to the A/D converter to sample signals synchronously (or asynchronously) with a constant (or irregular) time interval between samples.

The equalizer may receive the digitized samples from the A/D converter, equalize the digitized samples, generate an equalized signal based on the equalized samples, and provide the equalized signal to the defect detector 206.

In some implementations, the equalizer may be a fixed finite impulse response (FIR) equalizer, a time varying FIR equalizer, an adaptive FIR, a decision feedback equalizer or the like. The equalizer may include one or more delay elements, weight elements and/or summing elements to provide the equalizer signal. In some implementations, the equalizer may be adjusted using a mean square error criterion or by decision feedback from the defect detector 206.

Based on the equalized signal, the defect detector 206 (and each sub-detector 208) may perform a discrimination function. In some implementations, the result of the discrimination function may be compared against a threshold or a set of thresholds associated with the defector detector 206 (or more specifically, the threshold(s) associated with each sub-detector 208) to generate one or more digital defect metrics or outputs (e.g., when the result of the discrimination exceeds the threshold or set of thresholds). In some implementations, the defector detector 206 may perform a set of test statistics or metrics rather than a single discrimination function before comparing the result with the threshold(s) of the sub-detectors 208.

In some implementations, the defect detector 206 (and associated sub-detectors 208) may require inputs other than the signal samples (e.g., digitized signal samples). For example, signal samples and bits detected from a Viterbi detector may be used as inputs of the defect detector 206.

In some implementations, the signal process/decoding module 204 may sample the readback signal under an asynchronous or synchronous sampling mode. Under the asynchronous mode, the signal process/decoding module 204 may sample the readback signal without being synchronized (e.g., phase locked) to the baud rate (or nominal frequency). In a synchronous mode, the defect detection may be delayed until timing recovery has synchronized the waveform sampling using a correct sampling frequency and phase.

Figure 3:
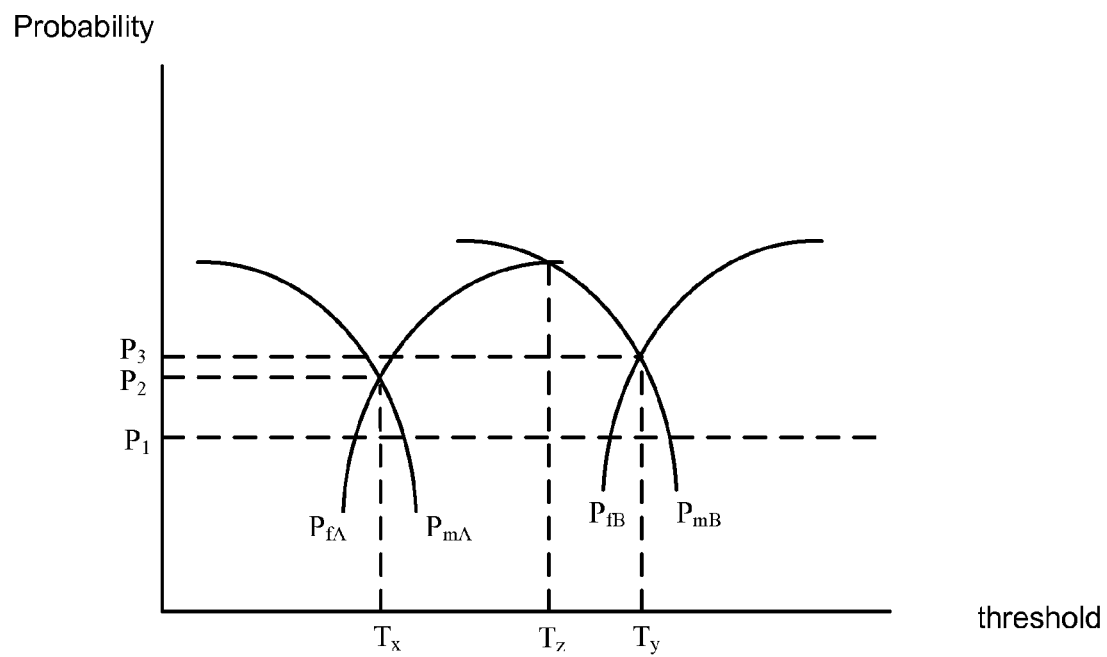
FIG. 3 shows an example behavior graph of a defect detector in a presence of two types of defects where different window lengths are used.

FIG. 3 shows an example behavior graph of a defect detector in the presence of two types of defects where different window lengths are used. Referring to FIG. 3, $P_{mA}$ and $P_{fA}$ represent a relationship between the probability of missed detection and the probability of false alarm for type-A defect (e.g., defects that are short and deep), respectively where a detection window length "$W_A$" is used. Specifically, with respect to type A defect, the probability of missed detection $P_{mA}$ is inversely proportional to the probability of false alarm $P_{fA}$. For example, as the threshold of a sub-detector increases, the probability of missed detection $P_{mA}$ decreases. Conversely, the probability of false alarm $P_{fA}$ increases as the threshold increases. While the threshold may be set at $T_x$ to strike a balance between the probability of missed detection $P_{mA}$ and the probability of false alarm $P_{fA}$, the resulting probability $P_2$ may not meet a desired probability value. For example, where the desired missed detection probability is set at $P_1$, the resulting probability $P_2$ would not be sufficient to meet the requirement.

Similarly, with respect to type-B defect (e.g., defects that are long and shallow) where a window length "$W_B$" is used, the probability of missed detection $P_{mB}$ is inversely proportional to the probability of false alarm $P_{fB}$. For example, as the threshold of a sub-detector increases, the probability of missed detection $P_{mB}$ decreases. Conversely, the probability of false alarm $P_{fB}$ increases as the threshold increases. While the threshold may be set at $T_y$ to strike a balance between the probability of missed detection $P_{mB}$ and the probability of false alarm $P_{fB}$, the resulting probability $P_3$ may not meet a targeted missed detection probability value $P_1$. Thus, in implementations where only a single defect detector or a single threshold is used, a trade-off exists between the probability of missed detection and the probability of a false alarm. Additionally, there is a trade off between detecting type-A defects and detecting type-B defects (e.g., where type-A defects but not type-B defects may be detected or where type-B defects but not type-A defects may be detected). For example, where only a single threshold $T_x$ is used, the probability of missed detection of a type-B defect is extremely high.

Further, while an average threshold (e.g., the average of $T_x$ and $T_y$ as indicated by $T_z$) may be used, the detection requirements for a single defect detector may conflict each other in the ROC (receiver operating characteristic) domain. For example, a threshold of $T_z$ results in high false alarm for type-A defect and at the same time extremely poor detection for type-B defect (e.g., due to high probability of a miss).

Thus, in some implementations, the defect detector 206 may include one or more sub-detectors 208a, 208b, . . . 208m. In some implementations, the signal process/decoding module 204 may provide the same signal samples to each sub-detector 208 (e.g., 200 signal samples to each sub-detector 208). In other implementations, the signal process/decoding module 204 may provide a different set of signal samples to each sub-detector 208.

In some implementations, each sub-detector 208 may be associated with a different sliding window length and a threshold. For example, defect sub-detector 208a may be associated with a sliding window length $W_1$ and a threshold $T_1$; defect sub-detector 208b may be associated with a sliding window length $W_2$ and a threshold $T_2$; and defect sub-detector 208m may be associated with a sliding window length $W_m$ and a threshold $T_m$. By implementing a defect detector 206 that includes one or more sub-detectors 208 each employing different sliding window length and threshold, defects with different physical characteristics may be detected more accurately.

In some implementations, the threshold of each sub-detector 208 may be defined with a specific relationship with respect to other thresholds of other sub-detectors 208. For example, the threshold $T_1$ of sub-detector 208a may be selected to be less than the threshold $T_2$ of sub-detector 208b and the threshold $T_m$ of sub-detector 208m. The threshold $T_2$ of sub-detector 208b also may be selected to be less than the threshold $T_m$ of sub-detector 208m. That is, the following relationship may be used to define the thresholds of sub-detectors 208: $T_1 < T_2 < \ldots < T_m$.

Similarly, the sliding window length of each sub-detector 208 may be defined with a specific relationship with respect to other sliding window lengths of other sub-detectors 208. For example, the sliding window length $W_1$ of sub-detector 208a may be selected to be less than the sliding window length $W_2$ of sub-detector 208b and the sliding window length $W_m$ of sub-detector 208m. The sliding window length $W_2$ of sub-detector 208b also may be selected to be less than the sliding window length $W_m$ of sub-detector 208m. In other words, the following relationship may be used to define the sliding window lengths of sub-detectors 208: $W_1 < W_2 < \ldots \leq W_m$.

In these implementations, by implementing an increasing relationship with respect to the threshold and sliding window length of each sub-detector, the probability of detection under a desired rate of false alarm may be maximized. For example, $\{T_1, W_1\}$ of sub-detector 208a may be chosen to maximize the probability of detection for type-A defect (e.g., short and deep defect). As another example, $\{T_1, W_m\}$ of sub-detector 208m may be chosen to maximize the probability of detection for type-B defect (e.g., long and shallow defect). As yet another example, $\{T_2, W_2\}$ of sub-detector 208b may be chosen to maximize the probability of detection for defects that may be classified as defects between type-A and type-B defects.

In some implementations, each sub-detector 208 may be defined with more than one threshold. For example, sub-detector 208a may be defined with a first threshold level $T_A$ and a second threshold $T_B$, and sub-detector 208b may be defined with a first threshold level $T_X$, a second threshold $T_Y$, and a third threshold $T_Z$.

In some implementations, the defect detector 206 or the sub-detectors 208 may include components such as, without limitations, multipliers, moving average filters, reconstruction filters, subtractors, summers and the like. Further details regarding the internal structure of the defect detector 206 or the sub-detectors 208 can be found, for example, in co-pending U.S. application Ser. No. 11/907,676 filed Oct. 16, 2007, and entitled "DEFECT DETECTION DESIGN", the disclosure of which is incorporated herein by reference in its entirety.

Figure 4A:
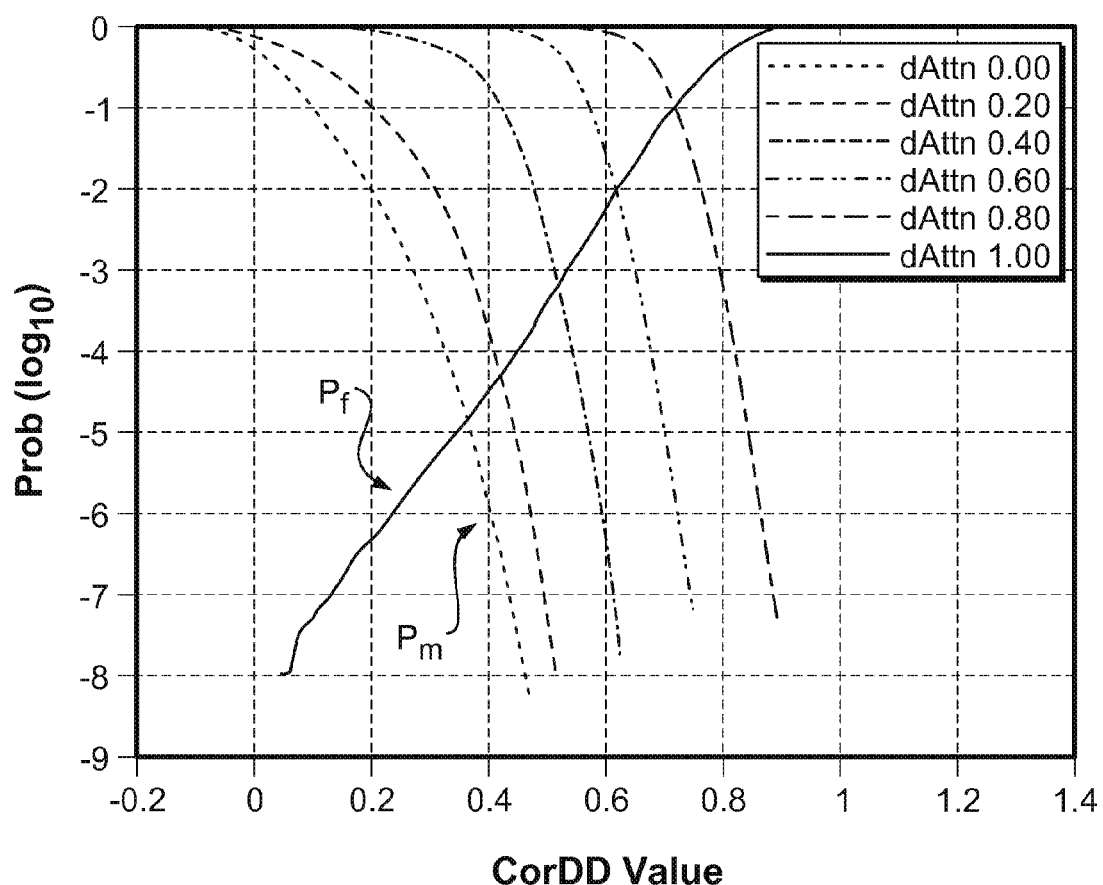
FIG. 4A show an example relationship between the probability of a miss and the probability of a false alarm for a sub-detector defined with a short window length.
Figure 4B:
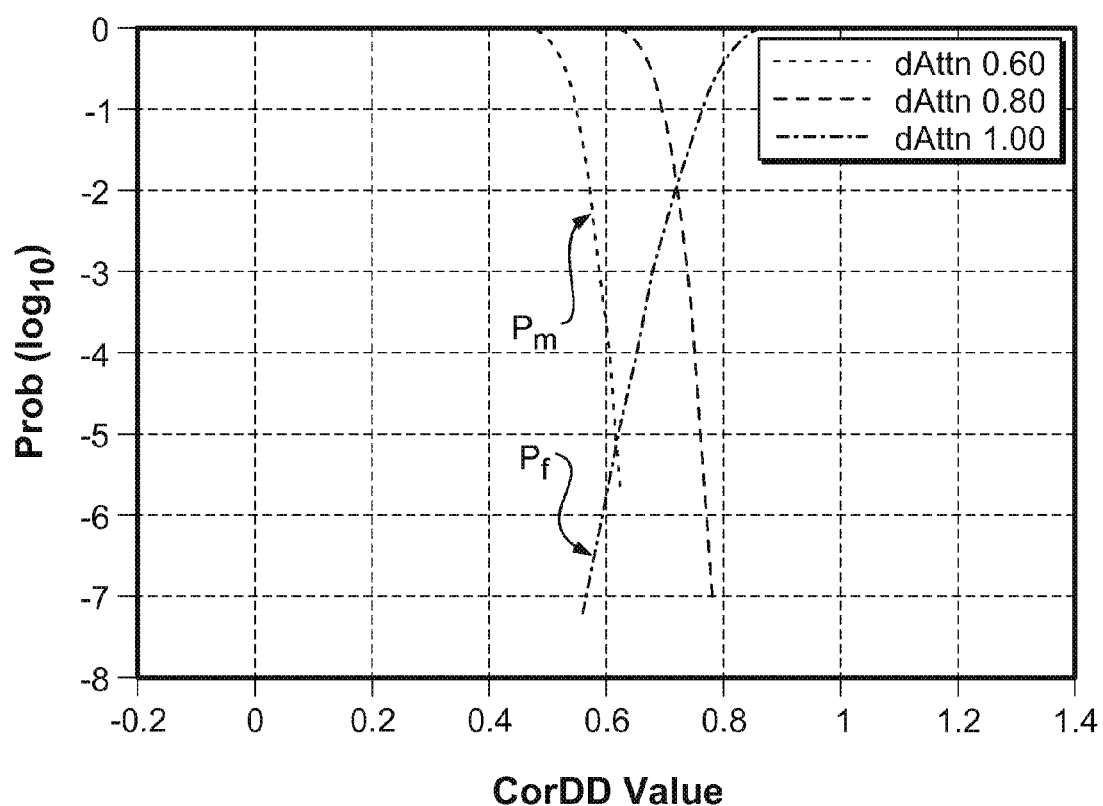
FIG. 4B show an example relationship between the probability of a miss and the probability of a false alarm for a sub-detector defined with a window length longer than that shown in FIG. 4A.

FIG. 4A show an example relationship between the probability of a miss and the probability of a false alarm for a sub-detector defined with a short window length, and FIG. 4B show an example relationship between the probability of a miss and the probability of a false alarm for a sub-detector defined with a window length longer than that shown in FIG. 4A. As shown in FIG. 4A, where a sub-detector is defined with a short window length (e.g., where the window length is 30), a small threshold (e.g., 0.4) may be selected so that the probability of a miss $P_m$ (as represented by the line "dAttn 0.0") and the probability of a false alarm $P_f$ (as represented by the line "dAttn 1.0") for deep defect may be less than $1e^{-5}$. In other words, a sub-detector defined with a short window length and a small threshold may be used to target detection of short and deep defect.

Referring to FIG. 4B, where a sub-detector is defined with a long window length (e.g., where the window length is 100), a large threshold (e.g., 0.6) may be selected so that the probability of a miss $P_m$ (as represented by the line "dAttn 0.6") and the probability of a false alarm $P_f$ (as represented by the line "dAttn 1.0") for shallow defect may be less than $1e^{-5}$. From FIG. 4B, it is also clear that a sub-detector defined with a long window length and a large threshold may be used to target detection of long and shallow defect.

In sum, as shown in FIGS. 4A and 4B, for different sliding window length, the optimal detection threshold may vary for each sub-detector 208. Specifically, a short sliding window length may use a small threshold to minimize probability of a false alarm, whereas a long sliding window length may use a large threshold to minimize the probability of a miss. Conversely, a short sliding window length may reduce the response latency and increase the probability of detecting short defects whereas a long sliding window length may increase the response latency and increase the probability of detecting long defects. Accordingly, by implementing a bank of sub-detectors 208 each defined with a different window length and detection threshold, an optimal detection for both short and deep defects (type-A defect) and long and shallow defects (type-B defect) may be achieved. Additionally, the parameters of each sub-detector 208 in the bank may be individually tailored to aim for a specific class of defects such that defects with various characteristics (e.g., various length and severity) also may be detected and identified for correction.

In some implementations, the output 210a, 210b, ... 210m of each sub-detector 208 may be fed to the combination logic 212, which may be used to generate a defect flag 214 indicative of the presence of a defect at a particular sector. In some implementations, the combination logic 212 may include OR logic such that any defect that may be detected by any of the sub-detectors 208 may immediately be interpreted by the combination logic 212 as a defect (e.g., which reduces the probability of a miss). In other implementations, the combination logic 212 may implement AND logic such that only defects that are common to all of the sub-detectors 208 are identified as a defect (e.g., which reduces the probability of false alarm). In yet other implementations, the combination logic 212 may implement multiple states of logic to determine a dominant defect identified by a majority of the outputs 210.

In some implementations, the combination logic 212 may set the output of the defect sub-detectors 208 with different priority or weight. As an example, defect sub-detector 208m (e.g., with a longest window length) may be set with a highest priority (or seniority) while defect sub-detector 208a (e.g., with a shortest window length) may be set with a lowest priority (or seniority). In this example, the final defect flag 214 (e.g., type and presence/absence) may be set based on the output of the defect sub-detector 208m (e.g., because defect sub-detector 208m includes a longest window length).

As another example, if there are three defect sub-detectors each detecting a different class or type of defect (e.g., type-A, type-B and type-C defects), then the combination logic 212 may rank each defect sub-detector 208 based on a range of priority (e.g., where the sub-detector detecting type-B defect has a highest priority). In this scenario, where the outputs of the three sub-detectors indicate a "1" for type-A defect, a "1" for type-B defect, and a "0" for type-C defect (e.g., where "1" indicates a detected defect), the combination logic 212 may set type-B defect as the defect flag 214 at the corresponding detected location(s) (e.g., because the sub-detector detecting type-B defect has the highest priority).

As will be readily recognized, the combination logic 212 also may employ more than one logic expression in evaluating the defect flag 214, and is not limited to only those discussed above.

Once a defect is flagged (as represented by the defect flag 214), the defective sector(s) corresponding to the defect may be identified by the processing module 122 or the control module 124. In some implementations, the identified defect may be stored on the disk 104. The disk drive may be formatted by reading the defect from the disk 104 and mapping the logical sequence of the sector(s) according to the location of the defective location. Many conventional schemes may be used to map the logical sequence of the locations, either by skipping over the defective locations or mapping the defective location to a spare location within a track, zone or disk. Once the disk 104 is formatted and the logical sequence of the sectors are mapped, the manufacturing of the disk drive system is complete and the disk drive system may be connected for use, for example, with a computer system.

As will be understood, the length of a detected defect may be greater than or smaller than the length of a sector. Thus, where a detected defect is smaller than the length of a sector, the logical sequence of the sector (as opposed to the location) may be mapped out.

In some implementations, the defect detection system 200 may mark and/or erase bits of information associated with the detected defect(s). Alternatively, the defect detection system 200 may freeze the timing of an adaptation (e.g., timing loop or automatic gain loop) running based on the readback signal 202. Freezing the timing of an adaptation can avoid the hard drive from adapting over abnormal signal samples. For example, during a sector-process stage, upon identifying a defect (e.g., its type and location), the timing loop or gain loop may be frozen (or terminated) to avoid performing adaptation over abnormal signal samples. The defect detection system 200 may otherwise take such actions as may be appropriate to reduce or eliminate detrimental effects of defective bit data reaching active and/or running applications and/or adaptations that may rely on valid, non-corrupt data extracted from the readback signal 202. Once the defect is passed, the adaptation can be resumed again.

Where a hard drive utilizes an iterative decoder to perform iterative decoding, the techniques discussed herein also may be applied to the iterative decoding process. For example, after a segment of a sector has been determined to contain a defect by the defect detection system 200, the input to the iterative decoder may be erased (e.g., by setting the log-likelihood ratios of the iterative decoder to zero) over the detected detective region(s) or sample(s) to improve the performance of the iterative decoding process.

In general, the bank of sub-detectors 208 may be applicable to any defect detection algorithm that operates on a sliding window spanning a number of signal samples. As an illustrative example, each sub-detector 208 may count the number of signal samples in a sliding window with amplitudes falling below a predetermined value (or crossing a predetermined value). In this example, if the number exceeds a predetermined threshold, a drop-out (or drop-in) may be detected by the sub-detector 208.

As another example, the defect detector 206 also may be employed in applications where envelop detectors are used. For example, each sub-detector 208 may include an envelop detector that calculates an average signal envelop amplitude over a sliding window. When the averaged signal envelop amplitude falls below (or crosses) a predetermined threshold, the sub-detector 208 may detect a drop-in. Envelop detectors of different window length and corresponding threshold may be included in the defect detector 206.

As yet another example, each sub-detector 208 may include a plurality of discrete time filters. Each time filter may be associated with a different defect detecting impulse response that may be employed to detect and distinguish between different types of media defects (e.g., long, medium or shallow defects). Also, the threshold of each sub-detector 208 may be programmable so that the media may be read multiple times using different predetermined thresholds in order to optimize the detection process and enhance the detection result. In this example, the sub-detector 208 may be programmable to adapt the defect detection system to a particular disk drive, data density, or magnetic media.

FIG. 5 is a flow chart showing an example process for detecting various classes of defect. Process 500 may be performed, for example, by the HDD system 100, and for clarity of presentation, the description that follows uses the HDD system 100 as the basis of examples for describing the process 500. However, another apparatus, system, or combination of systems, may be used to perform the process 500.

Referring to FIG. 5, process 500 may begin with sampling a data signal associated with a storage medium to generate one or more signal samples (502). For example, a data pattern may be generated and written to at least a portion of a disk. Then, the written data may be read back as a data signal by a read/write head.

In some implementations, the data signal may be segmented and sampled into one or more signal sample groups separated by a predetermined number of signal samples.

Then, a first set of parameters may be applied to the signal samples to generate a first output and a second set of parameters may be applied to the signal samples to generate a second output (504). In some implementations, applying a first set of parameters may include applying a first set of parameters that maximize a probability of detecting a first class of defect, and applying a second set of parameters may include applying a second set of parameters that maximize a probability of detecting a second class of defect different from the first class of defect.

In some implementations, a first class of defect detected may include short and deep defect, and a second class of defect detected may include detecting long and shallow defect.

In some implementations, a first set of parameters may be applied to the signal samples that includes a first window and a first threshold. Similarly, a second set of parameters may be applied to the signal samples that may include a second window different from the first window and a second threshold different from the first threshold.

In some implementations, media defects may be identified based on the first output and the second output (506). In some implementations, media defects may be identified by determining a first indicator value from the signal samples within the first window. The first indicator value may then be compared with the first threshold to generate the first output. Similarly, a second indicator value from the signal samples within the second window may be determined. The second indicator value may be compared with the second threshold to generate the second output.

In some implementations, the second window may be larger than the first window, and the second threshold may be greater than the first threshold.

In some implementations, media defects may be identified by applying a predetermined logic to the first output and the second output. For example, an OR logic may be applied to the first output and the second output. As another example, an AND logic may be applied to the first output and the second output.

In some implementations, a weighting scheme may be implemented such that the first output and the second output are given different priority or weight in identifying the media defects. For example, the first output may be set with a higher priority than the second priority. In this example, the media defect may be set based on the first output (assuming the defect associated with the second output is different from the defect associated with the first output).

In some implementations, operations 502-506 may be performed in the order listed, in parallel (e.g., by the same or a different process, substantially or otherwise non-serially), or in series to achieve the same result. Also, the order in which the operations are performed may depend, at least in part, on what entity performs the method. Operations 502-506 further may be performed by the same or different entities or systems.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including a computer program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

In some implementations, the defect detection system 200 may be implemented in an defect detection module as part of the control module. In these implementations, a system may be provided that includes the defect detection module and the head-disk assembly that includes the disk 104 and the head 108 that reads signal from the disk 104.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
    sampling a data signal associated with a storage medium to generate signal samples;
    applying a first set of parameters indicating a first window to the signal samples to generate a first output, the first output being based on a degree of correlation between detected data bits and signal samples in the first window, and a second set of parameters indicating a second window different from the first window to the signal samples to generate a second output; and
    identifying media defects based on the first output and the second output.

2. The method of claim 1, where the first set of parameters are designed to maximize a probability of detecting a first class of defect; and
    the second set of parameters are designed to maximize a probability of detecting a second class of defect different from the first class of defect.

3. The method of claim 2, where the first class of defect includes a short and deep defect, and the second class of defect includes a long and shallow defect.

4. The method of claim 1, where the first set of parameters indicates the first window and a first threshold.

5. The method of claim 4, where the second set of parameters indicates the second window and a second threshold different from the first threshold.

6. The method of claim 5, further comprising:
    determining a first indicator value from the signal samples within the first window;
    comparing the first indicator value with the first threshold to generate the first output;
    determining a second indicator value from the signal samples within the second window; and
    comparing the second indicator value with the second threshold to generate the second output.

7. The method of claim 5, where the second window is larger than the first window.

8. The method of claim 5, where the second threshold is greater than the first threshold.

9. The method of claim 1, where the media defects are identified by applying an OR logic to the first output and the second output.

10. The method of claim 1, where the media defects are identified by applying different weights to the first output and the second output.

11. An apparatus comprising:
    a signal process/decoding module to process data signals corresponding to data on a storage medium to generate one or more groups of signal samples;
    a plurality of defect detectors each receiving the one or more groups of signal samples, applying a different set of parameters indicating a different window to the one or more groups of signal samples, and generating a corresponding output based on a degree of correlation between detected data bits and signal samples in the one or more groups of signal samples; and
    logic to receive the corresponding outputs from the plurality of defect detectors and identify one or more media defects based on the outputs.

12. The apparatus of claim 11, further comprising a defect detection module that includes the plurality of defect detectors as defect sub-detectors.

13. The apparatus of claim 11, where the plurality of defect detectors include:
    a first defect sub-detector indicating a first window and a first threshold; and
    a second defect sub-detector indicating a second window different from the first window and a second threshold.

14. The apparatus of claim 13, where the first defect sub-detector determines a first indicator value from the signal samples within the first window, and compares the first indicator value with the first threshold to generate a first output; and where the second defect sub-detector determines a second indicator value from the signal samples within the second window, and compares the second indicator value with the second threshold to generate a second output.

15. The apparatus of claim 14, where the logic outputs a final detector output identifying the one or more media defects based on the first output of the first defect sub-detector and the second output of the second defect sub-detector.

16. The apparatus of claim 14, where the second window is larger than the first window, and the second threshold is greater than the first threshold.

17. The apparatus of claim 13, where the plurality of detectors further include:
a third sub-detector indicating a third window and a third threshold, the third window being different from the first window and the second window, and the third threshold being different from the first threshold and the second threshold.

18. The apparatus of claim 17, where the first window and the first threshold are configured to target a first class of defect;
where the second window and the second threshold are configured to target a second class of defect; and
where the third window and the third threshold are configured to target a third class of defect.

19. The apparatus of claim 18, where the third class of defect includes one or more defects in the first class and the second class.

20. The apparatus of claim 11, where the one or more groups of signal samples includes a plurality of groups of signal samples, and each signal sample in the plurality of groups is different.

21. An apparatus comprising:
a signal process/decoding module to process data signals corresponding to data on a storage medium to generate one or more groups of signal samples;
a plurality of defect detectors each receiving the one or more groups of signal samples and applying a different set of parameters indicating a different window to the one or more groups of signal samples; and
logic to receive corresponding outputs from the plurality of defect detectors and identify one or more media defects based on the outputs,
where:
the one or more groups of signal samples includes at least one group that is partitioned into a plurality of segments, each segment corresponding to a sector of the storage medium; and
the window of each of the plurality of defect detectors covers a different segment of the signal samples.

* * * * *